United States Patent

[11] 3,621,042

| [72] | Inventors | Zdzislaw Jan Bujwid<br>London;<br>John Francis Hodgson, Romford, both of<br>England |
|---|---|---|
| [21] | Appl. No. | 21,194 |
| [22] | Filed | Mar. 19, 1970 |
| [45] | Patented | Nov. 16, 1971 |
| [73] | Assignee | May F. Baker Limited<br>Dagenha, Essex, England |
| [32] | Priority | Mar. 20, 1969 |
| [33] | | Great Britain |
| [31] | | 14,786/69 |

[54] PROCESS FOR THE PREPARATION OF METHYL p-AMINOBENZENESULPHONYLCARBAMATE
12 Claims, No Drawings

[52] U.S. Cl. .................................................. 260/397.7,
260/470
[51] Int. Cl. .................................................. C07c143/80
[50] Field of Search ........................................ 260/470,
392.7

[56] References Cited
FOREIGN PATENTS
122,096   7/1901   Germany......................
OTHER REFERENCES
Bortnick N., et al., J. Am. Chem. Soc. 1956 78 4358

*Primary Examiner*—Lorraine A. Weinberger
*Assistant Examiner*—John F. Terapane
*Attorney*—Stevens, Davis, Miller & Mosher ABSTRACT: Methyl p-aminobenzenesulphonylcarbamate and its alkali metal and alkaline earth metal salts, which are useful as herbicides, are prepared by a new process which comprises reacting an alkali metal or alkaline earth metal salt of sulphanilamide with dimethyl carbonate in methanol at a temperature up to the boiling point of the reaction mixture. The free methyl p-aminobenzenesulphonylcarbamate can be obtained from the resulting alkali metal or alkaline earth metal salt of the sulphonylcarbamic ester by treatment with an acid.

PROCESS FOR THE PREPARATION OF METHYL p-AMINOBENZENESULPHONYLCARBAMATE

This invention relates to a new process for the preparation of methyl p-aminobenzenesulphonylcarbamate of the formula:

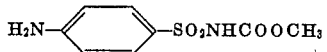
    I and its alkali metal and alkaline earth metal salts, which possess valuable herbicidal properties as described in the specifications of British Pat. Nos. 1,040,541 and 1,052,881 both entitled "Herbicidal Compositions" and granted to May & Baker Limited on applications filed 8th Sept. 1961 and 7th Sept. 1962 respectively.

In the aforementioned British Patent specifications there are described a number of processes by which the compound of formula I can be prepared, viz.

a. Reaction of a sulphonamide derivative of the general formula:

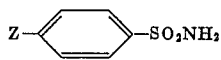
    II (wherein Z represents a monoacylamino group containing one to four carbon atoms) with methyl chloroformate in an aqueous or organic medium in the presence of a basic condensing agent, followed by hydrolysis of the acylamino group in the resulting methyl p-acylaminobenzenesulphonylcarbamate to an amino group;

b. Reaction of a sulphonyl halide of the general formula:

    III (wherein Z is as hereinbefore defined and Hal represents a halogen atom) with methylcarbamate, or an alkali metal derivative thereof, in an organic solvent, followed by hydrolysis of the acylamino group in the resulting product to an amino group;

c. Reaction of a urea derivative of the general formula:

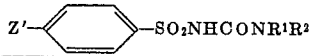
    IV (wherein Z' represents a primary amino group or a monoacylamino group containing one to four carbon atoms, and $R^1$ and $R^2$ are the same or different and each represents a hydrogen atom or a lower alkyl group) with methanol, in the presence of an acid catalyst, followed, when Z' represents a monoacylamino group, by hydrolysis of the acylamino group in the resulting product to an amino group;

d. Oxidation of a sulphenyl or sulphinyl compound of the general formula:

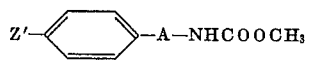
    V (wherein Z' is as hereinbefore defined and —A— represents —S— or —SO—) followed, when Z' represents a monoacylamino group, by hydrolysis of the acylamino group in the resulting product to an amino group, and e. Catalytic hydrogenation of methyl p-nitrobenzenesulphonylcarbamate in a suitable solvent, using Raney nickel or Adams' platinum catalyst, to convert the nitro group to a primary amino group.

The compound of formula I can also be prepared by application of a known method for sulphanilamide, sulphonylurethanes by reacting an alkali metal or alkaline earth metal salt of a sulphonamide with a pyrocarbonic ester, i.e.

f. Reaction of an alkali metal or alkaline earth metal salt of an $N^4$-acylsulphanilamide with pyrocarbonic dimethyl ester, followed by hydrolysis of the acylamino group in the resulting product to an amino group.

In the aforementioned processes (a), (b), (c) and (d) when the symbols Z and Z' in the starting materials of formula II, III, IV and V represent monoacylamino groups, it is necessary to remove the acyl groups in the resulting intermediate products by hydrolysis to obtain methyl p-aminobenzenesulphonylcarbamate. This hydrolysis, and that involved in process (f), is preferably carried out by treatment with an excess of aqueous sodium hydroxide solution at laboratory temperature.

It has now unexpectedly been found as a result of research and experimentation that methyl p-aminobenzenesulphonylcarbamate and its alkali metal and alkaline earth metal salts can be prepared in yields of over 90 percent of the theoretical yield by reacting an alkali or alkaline earth metal salt of sulphanilamide with dimethyl carbonate in a particular solvent medium, i.e., methanol, under anhydrous or substantially anhydrous conditions.

The new and advantageous process of the present invention for the preparation of the compound of formula I and its alkali metal and alkaline earth metal salts therefore comprises reacting a salt of sulphanilamide of the formula:

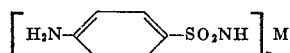
    VI (wherein M represents an alkali metal or alkaline earth metal atom, e.g., sodium, potassium, lithium, magnesium or calcium, more particularly sodium, and n represents 1 when M represents an alkali metal atom and n represents 2 when M represents an alkaline earth metal atom) with dimethyl carbonate in methanol at a temperature up to the boiling point of the reaction mixture, preferably at a temperature of from 25° to 65° C., and optionally converting by known methods the resulting alkali metal or alkaline earth metal salt of methyl p-aminobenzenesulphonylcarbamate into the free methyl p-aminobenzenesulphonylcarbamate.

The reaction is advantageously carried out at or near the reflux temperature of the reaction mixture, i.e., about 65° C., as very good yields of the desired products are thereby obtained in the shortest time, for example 8 to 24 hours. Generally, the lower the reaction temperature the longer is the time required to obtain good yields of the benzenesulphonylcarbamate; for instance at 25° C. a reaction time of some days, e.g., 3 to 4 days, may be required to obtain yields in excess of 90 percent.

For each molar proportion of the sulphanilamide salt of general formula VI employed, at least one molar proportion, and preferably between 1 and 1.2 molar proportions, of dimethyl carbonate is utilized. It is preferred to carry out the reaction in the presence of a small amount (e.g., 0.05 to 0.15 moles per mole of compound of general formula VI) of an alkali metal or alkaline earth metal derivative, preferably an alkali metal e.g., sodium) derivative, such as a hydride (e.g., sodium hydride), an alkoxide e.g., sodium methoxide) or an amide (e.g., sodamide), which serves to accelerate the rate of the reaction between the compounds of formula VI and dimethyl carbonate.

The sulphanilamide salts of general formula VI may optionally be prepared in situ by the addition of sulphanilamide to a solution of an alkali metal or alkaline earth metal alkoxide, preferably in slight excess (e.g., between 1.05 and 1.15 moles of sodium alkoxide per mole of sulphanilamide) to provide the small amount of alkali metal or alkaline earth metal derivative mentioned above, in the methanol solvent medium.

Methanol may be removed after completion of the reaction by the addition of water and distillation, and the resulting aqueous solutions of alkali metal or alkaline earth metal salts of methyl p-aminobenzenesulphonylcarbamate used as herbicidal spray concentrates. If desired, the aqueous solutions may be treated with calcium ions, e.g., with calcium chloride or calcium hydroxide, to remove carbonate ions unless calcium sulphanilamide and/or a calcium derivative has been used in the preparation. Removal of carbonate ions from the aqueous solutions is desirable to prevent precipitation if, when used as herbicidal spray concentrates, they are to be diluted with hard water before spraying. Alternatively, the alkali metal or alkaline metal salt of methyl p-aminobenzenesulphonylcarbamate may be isolated from the methanolic or aqueous solution obtained by filtration or decantation, if necessary after concentration of its solution, or by the complete removal of the methanol by the usual means, such as evaporation, if desired under reduced pressure. The salt of the benzenesulphonylcarbamate may be 'salted-out' from its solution by the addition of a salt introducing a further quantity of the same or a different alkali metal or alkaline earth metal. However this procedure is not convenient for the production of the sodium salt. Alternatively, the benzenesulphonylcarbamate of formula I itself may be precipitated by the addition of acid (e.g., hydrochloric acid) and separated by filtration or decantation.

The methyl p-aminobenzenesulphonylcarbamate obtained by the process of the present invention may contain, as a byproduct of the reaction, a minor proportion, e.g., about 5 percent by weight of the product under the preferred conditions described above, of methyl p-methoxycarbonylaminobenzenesulphonylcarbamate. It is not necessary to separate out the latter compound since it possesses similar herbicidal properties to those of methyl p-aminobenzenesulphonylcarbamate although less active on a weight-by-weight basis, but, if desired, this byproduct may be removed by dissolving the reaction product in dilute aqueous acid, filtering and reprecipitating the methyl p-aminobenzenesulphonylcarbamate by adjusting the pH to about 3. The production of methyl p-methoxycarbonylaminobenzenesulphonylcarbamate is favored by increasing the proportion of alkali metal or alkaline earth metal derivative in the reaction mixture or by increasing the proportion of dimethyl carbonate. For this reason, it is preferably not to exceed substantially the proportion of added alkali metal or alkaline earth metal derivative indicated above as being preferred. Similarly, it is preferably not to exceed substantially the proportion of dimethyl carbonate indicated above as being preferred. Unreacted sulphanilamide may be present in the product obtained by the process of the present invention and it may, if desired, be removed by washing the product with water. The presence of a small proportion of sulphanilamide, e.g., about 3 percent by weight, does not, however, render the methyl p-aminobenzenesulphonylcarbamate unsuitable for use as a herbicide without further purification and it is, therefore, usually unnecessary to remove such small proportions of sulphanilamide.

A surprising aspect of the process of this invention is that the reaction between the sulphanilamide salt and dimethyl carbonate proceeds satisfactorily only in methanol as solvent medium. When other possible solvent media such as other alcohols (e.g., ethanol, isopropanol and n-butanol), ketones (e.g., methyl ethyl ketone and methyl isobutyl ketone), dioxan and glycols (e.g., ethylene glycol) are employed, commercially useful yields of the compound of formula I are unobtainable.

It is known that dialkyl carbonates may be used to convert aliphatic amines into the corresponding N-substituted alkyl-carbamates (Bortnick, N; et al., J. Am. Chem. Soc. 1956, 78, 4358, and German Pat. specification No. 122,096). The most widely used reagent for converting primary amines into the corresponding N-substituted methylcarbamates is methyl chloroformate which, like dimethyl carbonate, is a derivative of carbonic acid. In particular, it is known, e.g., from example IX of British Pat. specification No. 1,040,541, that when sulphanilamide is reacted with a limited amount of methyl chloroformate, using diethylaniline as acid binding agent, the aromatic $N^4$-amino group is quantitatively acylated, the major portion of the reaction product being p-methoxycarbonylaminobenzenesulphonamide and only a relatively minor proportion being further acylated upon the amino portion of the sulphonamide group to give methyl p-methoxycarbonylaminobenzenesulphonylcarbamate. It would, therefore, be expected that the process of the present invention would similarly produce p-methoxycarbonylaminobenzenesulphonamide as the major reaction product with, possibly, a minor proportion of methyl p-methoxycarbonylaminobenzenesulphonylcarbamate. The fact that in the process of the present invention the methoxycarbonyl group is introduced primarily into the sulphonamide amino group with the production of only a minor proportion of a product, methyl p-methoxycarbonylaminobenzenesulphonylcarbamate, in which the methoxycarbonyl group has been introduced into both the aromatic primary amino group in the para-position of the benzene ring, which is freely available for acylation, and into the amino portion of the sulphonamide group, is, accordingly, surprising and unexpected.

When obtained in the form of the free methyl p-aminobenzenesulphonylcarbamate, the compound may, if desired, for the purposes of its use as a herbicide, be converted into an alkali metal, alkaline earth metal, ammonium or amine salt by known methods, for example by the procedures described in British Pat. specification No. 1,052,881.

The new process of the present invention for the preparation of methyl p-aminobenzenesulphonycarbamate and its alkali metal and alkaline earth metal salts possesses the following desirable properties:

1. the process is a single stage reaction which uses starting materials which are readily available articles of commerce or which can be readily prepared in situ from such materials;
2. no complicated manipulations are required;
3. the reaction can be carried out in concentrated solutions, thereby permitting a large output per unit volume capacity of equipment;
4. the direct product, an alkali metal or alkaline earth metal salt of methyl p-aminobenzenesulphonylcarbamate, is obtained in aqueous solutions which are suitable for use in herbicidal spray concentrates without prior isolation of the active ingredient;
5. high yields of the desired product are obtained which are of adequate purity to be used as herbicides without further purification;
6. protection, for example by the introduction of a protective acyl group, of the primary amino group in the starting materials of formula VI is unnecessary;
7. the reaction may be carried out under alkaline conditions throughout, in which case the use of acid resistant equipment or a combination of acid- and alkali-resistant equipment for various reaction steps, is unnecessary.

None of the previously known processes (a) to (f) hereinbefore mentioned possess all these properties for the preparation of the compound of formula I or its alkali metal or alkaline earth metal salts.

By the term "known methods" as used in this specification is meant methods heretofore employed or described in the chemical literature.

The following examples illustrate the process of the present invention. [The aromatic primary amino group in the product was determined by titration with 0.1M sodium nitrite solution and the result equated with the equivalent amount of pure methyl p-aminobenzenesulphonylcarbamate ('assay by nitrite titration'). Using this assay, any unreacted sulphanilamide will also be recorded. The sulphonylcarbamate group was determined by titration of a solution of the product in anhydrous dimethylformamide with a 0.1N solution of lithium methoxide in anhydrous methanol/toluene mixture ('assay by nonaqueous titration'). The result was equated to the equivalent amount of pure methyl p-aminobenzenesulphonylcarbamate. This titration does not record sulphanilamide but does record any methyl p-methoxycarbonylaminobenzenesulphonylcarbamate which may be present. Unreacted sulphanilamide was determined by thin-layer chromatography (TLC) using silica gel mixed with a fluorescent pigment as indicator. A methanol solution of the sample was spotted onto the TLC plate, the chromatogram then developed, in the case of examples 1 to 11, with a mixture of methanol (15 parts by volume) and chloroform (80 parts by volume) or, in the case of examples 12 to 17, with a mixture of glacial acetic acid (20 parts by volume) and chloroform (80 parts by volume), and the percentages of sulphanilamide and, in case of examples 15 and 17, methyl p-methoxycarbonylaminobenzenesulphonylcarbamate were assessed, by comparison with pure standards, under ultraviolet light. The purity of the product can be gauged by a study of the combination of results in these three determinations.]

EXAMPLE 1

Sulphanilamide (86 g.; 0.5 mole) was added to a solution of sodium methoxide (0.575 mole) in methanol, prepared by dissolving sodium (13.2 g.) in dry methanol (150 ml.), and the mixture was heated under reflux, with stirring, for 35 minutes. Dimethyl carbonate (54 g.; 0.6 mole) was then added and heating under reflux was continued for 16½ hours.

The reaction mixture was then distilled. When 89 ml. of distillate (containing methanol and unreacted dimethyl carbonate, which may be reused) had been collected, water (200 ml.) was added to the residue and distillation was continued until the temperature of the mixture reached 95° C. (48.5 ml. distillate). The mixture was cooled to ambient temperature. The pH of the mixture was adjusted to 7 by the addition of concentrated hydrochloric acid (7 ml.). The mixture was seeded with a small quantity of sulphanilamide and then stirred for one hour; no separation of sulphanilamide was observed. The mixture was clarified by filtration. Concentrated hydrochloric acid (37.5 ml.) was added to the filtrate, with stirring, to give a pH of 3, and the resulting precipitate was filtered off, washed with water (3×100 ml.) and dried to give methyl p-aminobenzenesulphonylcarbamate (108.5 g; 94.3 percent of the theoretical yield on sulphanilamide), m.p. 140.5° C. (with decomposition).

[Assay by nitrite titration = 97.5%:
Assay by nonaqueous titration = 96.6%;
Sulphanilamide content by TLC = approx. 1%;
0.035 mole dimethyl carbonate was recovered.]

Methyl p-aminobenzenesulphonylcarbamate was also prepared by the procedure described above, but starting with 0.5 mole sulphanilamide, and using various reaction times and quantities of dimethyl carbonate and sodium methoxide. The results are given in the following table (the total quantity of methanol used, including methanol for preparing sodium methoxide, was 150 ml., except in example 4, where 100 ml. was used);

The two following examples 5 and 6 follow essentially the procedure of example 1, but the dimethyl carbonate was added in two portions.

EXAMPLE 5

Sulphanilamide (86 g.; 0.5 mole) was added to a solution of sodium methoxide (0.5 mole) in methanol, prepared by dissolving sodium (11.5 g.) in dry methanol (150 ml.), and the mixture was heated under reflux, with stirring, for 25 minutes. Dimethyl carbonate (45 g.; 0.5 mole) was then added and heating under reflux was continued for 36 hours, a further quantity of dimethyl carbonate (9 g.; 0.1 mole) being added after 4 hours.

The reaction mixture was then distilled. When 93.5 ml. of distillate (containing methanol and unreacted dimethyl carbonate, which may be reused) had been collected, water (200 ml.) was added to the residue and distillation was continued until the temperature of the mixture reached 95° C. (49 ml. distillate). The mixture was treated with water (50 ml.), cooled to ambient temperature and the pH adjusted to 7 by addition of concentrated hydrochloric acid (9.7 ml.). The mixture was seeded with a small quantity of sulphanilamide, then stirred for 1 hour and filtered from a small quantity (5.3 g.; 0.03 mole) of unreacted sulphanilamide. Concentrated hydrochloric acid (35.5 ml.) was added to the filtrate, with stirring, to give a pH of 3, and the resulting precipitate was filtered off, washed with water (6×50 ml.) and dried to give methyl p-aminobenzenesulphonylcarbamate (90.2 g.; 78.4 percent of the theoretical yield from sulphanilamide), m.p. 139° C. (with decomposition).

[Assay by nitrite titration = 99.5 percent:
Assay by nonaqueous titration = 98.9 percent;
Sulphaniliamide content by TLC = approx. 2 percent;
0.035 mole of dimethylcarbonate was recovered].

EXAMPLE 6

The procedure of example 5 was followed, but using 0.5 mole sulphanilamide 0.6 mole dimethyl carbonate, 0.525 mole sodium methoxide and a 20 hour reaction period, to give methyl p-aminobenzenesulphonylcarbamate (94 g.; 81.7 percent of the theoretical yield on sulfanilamide, m.p. 139° C. (with decomposition).

[Assay by nitrite titration = 99.2 percent:
Assay by nonaqueous titration = 95.7 percent;
Sulphanilamide content by TLC = approx. 3 percent;
4.0 g. (0.023 mole) sulphanilamide was recovered].

EXAMPLE 7

The procedure of example 5 was followed, but using 0.5 mole sodium sulphanilamide, 0.6 mole dimethyl carbonate and 0.075 mole sodium methoxide and a reaction period of 22½ hours, to give methyl p-aminobenzenesulphonylcarbamate (105.2 g.; 91.7 percent of the theoretical yield on sodium sulphanilamide m.p. 138° C. (with decomposition).

[Assay by nitrite titration = 94.9 percent:
Assay by nonaqueous titration with lithium
methoxide = 96.2 percent;
Sulphanilamide content by T.L.C. = approx. 2 percent;
0.045 mole of dimethyl carbonate was recovered].

EXAMPLE 8

The procedure of example 1 was followed, but reacting 0.5

TABLE

| Example No. | Dimethyl carbonate (moles) | Sodium methoxide (moles) | Reaction period (hours) | Yield in grams of methyl p-aminobenzene sulphonyl-carbamate | Yield (percent on sulphanilamide) | M.P. of product (°C. dec.) | Percentage assay by nitrite titration | Percentage assay by non-aqueous titration with lithium methoxide | Recovered dimethyl carbonate (moles) | Recovered sulphanilamide | Percentage sulphan amide content of product by T.L.C. |
|---|---|---|---|---|---|---|---|---|---|---|---|
| 2 | 0.6 | 0.575 | 8 | 105.1 | 91.5 | 139 | 95.2 | 97.5 | 0.04 | 0 | <1 |
| 3 | 0.6 | 0.575 | 10 | 105.6 | 91.9 | 138.5 | 94.4 | 96.5 | 0.045 | 0 | <1 |
| 4 | 0.55 | 0.538 | 20 | 100.8 | 87.9 | 137.5 | 95.0 | 95.8 | 0.02 | 0 | <1 | sulfanilamide, of potassium sulphanilamide 0.6 mole dimethyl carbonate and 0.075 mole sodium methoxide together for 20 hours, to give methyl p-aminobenzenesulphonylcarbamate (95.9 g.; 83.1 percent of the theoretical yield on potassium sulphanilamide), m.p. 136° C. (with decomposition).

[Assay by nitrite titration = 96.1%:
Assay by nonaqueous titration with lithium
methoxide = 93.9 percent;
Sulphanilamide content by T.L.C. = 9 percent;
0.025 mole of dimethyl carbonate was recovered.]

The product was purified as follows:

Methyl p-aminobenzenesulphonylcarbamate (25 g.) was dissolved in N hydrochloric acid (250 ml.) at 20°–25° C. A small quantity of insoluble matter, consisting mainly of methyl p-methoxycarbonylaminobenzenesulphonylcarbamate, was filtered off and washed with water (4×5 ml.). The combined filtrate and washings were brought to pH 3 by addition of 10N sodium hydroxide solution. The product was filtered off, washed with water (3×10 ml.) and dried, to give methyl p- aminobenzenesulphonylcarbamate, m.p. 141° C. (with decomposition).

[Assay by nitrite titration = 100.0 percent:
Assay by nonaqueous titration with lithium methoxide = 99.4 percent;
methoxide = 99.4 percent;
Sulphanilamide content by T.L.C. = less than 0.5 percent].

EXAMPLE 9

The procedure of example 1 was followed, but reacting 0.5 mole sodium sulphanilamide, 0.6 mole dimethyl carbonate and 0.075 mole magnesium methoxide together for 20½ hours, to give methyl p-aminobenzenesulphonylcarbamate (102.5 g.; 89.2 percent of the theoretical yield on sulphanilamide), m.p. 140° C. (with decomposition).

[Assay by nitrite titration = 98.7 percent:
Assay by nonaqueous titration with lithium methoxide = 97.5 percent;
Sulphanilamide content by T.L.C. = approx. 3 percent;
0.08 mole dimethyl carbonate was recovered].

EXAMPLE 10

The procedure of example 1 was followed, but reacting 0.5 mole magnesium sulfanilamide (prepared in situ from sulfanilamide and magnesium methoxide), 0.6 mole dimethyl carbonate and 0.0375 mole magnesium methoxide together for 21 hours, to give methyl p-aminobenzenesulphonylcarbamate (63.6 g.; 55.3 percent of the theoretical yield on sulphanilamide), m.p. 138° C. (with decomposition).

[Assay by nitrite titration = 100.7 percent:
Assay by nonaqueous titration with lithium methoxide = 94.9 percent;
Sulphanilamide content by T.L.C. = approx. 12 percent;
0.17 mole of dimethyl carbonate and 0.18 mole sulphanilamide were recovered].

The product from the above preparation was purified by the procedure described in example 8 to give methyl p-aminobenzenesulphonylcarbamate m.p. 142.5° C. (with decomposition).

[Assay by nitrite titration = 99.8 percent:
Assay by nonaqueous titration with lithium methoxide = 99.4 percent;
Sulphanilamide content by T.L.C. = less than 0.5 percent].

EXAMPLE 11

The procedure of example 5 was followed, but reacting sodium sulphanilamide (prepared in situ from 0.5 mole sulphanilamide and 0.5 mole sodium methoxide) with 0.6 mole dimethyl carbonate in the presence of 0.075 mole sodamide for 19½ hours, to give methyl p-aminobenzenesulphonylcarbamate (104.8 g.; 91.3 percent of the theoretical yield on sulphanilamide), m.p. 138° C. (with decomposition).

[Assay by nitrite titration = 94.2 percent:
Assay by nonaqueous titration with lithium methoxide==96.8 percent;
Sulphanilamide content by T.L.C. = less than 0.5 percent].

EXAMPLE 12

The procedure of example 1 was followed, but reacting 0.5 mole lithium sulphanilamide (prepared in situ from sulphanilamide and lithium methoxide), 0.6 mole dimethyl carbonate and 0.075 mole lithium methoxide together for 16 hours, to give methyl p-aminobenzenesulphonylcarbamate (108.5 g.; 94.0 percent of the theoretical yield on sulphanilamide), m.p. 140° C. (with decomposition)

[Assay by nitrite titration = 95.2 percent:
Assay by nonaqueous titration with lithium methoxide = 99.9 percent;
Sulphanilamide content by T.L.C. = <0.5 percent;
0.06 mole of dimethyl carbonate was recovered].

EXAMPLE 13

The procedure of example 1 was followed, but reacting 0.5 mole potassium sulphanilamide (prepared in situ from sulphanilamide and potassium methoxide), 0.6 mole dimethyl carbonate and 0.075 mole potassium methoxide together for 16 hours, to give methyl p-aminobenzenesulphonylcarbamate (81.9 g.; 71.2 percent of the theoretical yield on sulfanilamide), m.p. 134.5° C. (with decomposition).

[Assay by nitrite titration = 97.1 percent:
Assay by nonaqueous titration with lithium methoxide = 94.5 percent;
Sulphanilamide content by T.L.C. = 6

0.08 mole of dimethyl carbonate and 0.05 mole of sulphanilamide were recovered].

EXAMPLE 14

The procedure of example 1 was followed, but reacting 0.5 mole calcium sulphanilamide (prepared in situ from sulphanilamide and calcium methoxide), 0.6 mole dimethyl carbonate and 0.0375 mole calcium methoxide together for 66 hours in 1 l. of methanol solvent, to give methyl p-aminobenzenesulphonylcarbamate (35 g.; 30.5 percent of the theoretical yield on sulphanilamide), m.p. 142° C. (with decomposition).

[Assay by nitrite titration = 99.8 percent:
Assay by nonaqueous titration with lithium methoxide = 97.8 percent;
Sulphanilamide content by T.L.C. = 2 percent;
0.31 mole dimethyl carbonate and 0.20 mole sulphanilamide were recovered].

EXAMPLE 15

The procedure of example 1 was followed using 0.5 mole sulphanilamide, 0.575 mole sodium methoxide, and various molecular proportions of dimethyl carbonate as indicated in the following Table with methanol as solvent medium. The reaction period was 20 hours.

TABLE

| Dimethyl carbonate (moles) | Yield in grams of methyl p-aminobenzene-sulphonyl-carbamate | Yield (percent on sulphanilamide) | Percentage assay by nitrite titration | Percentage assay by non-aqueous titration with lithium methoxide | Percentage sulphanilamide content by T.L.C. | Percentage by-product content by T.L.C. |
|---|---|---|---|---|---|---|
| 0.5 | 98.5 | 85.7 | 96.6 | 98.2 | <<1 | 1 |
| 0.75 | 111.1 | 96.6 | 90.4 | 97.3 | <<1 | 10 |
| 1.0 | 113.4 | 98.6 | 87.8 | 96.9 | <<1 | 20 |

The byproduct was methyl p-methoxycarbonylaminobenzenesulphonylcarbamate. No sulphanilamide was recovered in any of the experiments.

In all instances the melting point of the methyl p-aminobenzenesulphonylcarbamate was 140° C. (with decomposition).

EXAMPLE 16

The procedure of example 1 was followed using 0.5 mole sulphanilamide 0.575 mole sodium methoxide and 0.6 mole dimethyl carbonate in methanol as solvent medium, but varying the reaction temperature after addition of the dimethyl carbonate from the reflux temperature, i.e., 65° C., to the temperatures specified in the following table.

TABLE

| Temperature, °C. | Reaction period (hours) | Yield in grams of methyl p-aminobenzene-sulphonyl-carbamate | Yield (percent on sulphanilamide) | Percentage assay by nitrite titration | Percentage assay by non-aqueous titration with lithium methoxide | Percentage sulphanilamide content by T.L.C. |
|---|---|---|---|---|---|---|
| 50 | 20 | 107.1 | 93.1 | 99.2 | 97.5 | <<1 |
| 40-45 | 20 | 101.7 | 88.4 | 98.8 | 98.1 | <<1 |
| 25 | 20 | 42.4 | 36.9 | 97.7 | 97.4 | 1 |
| 25 | 90 | 92.6 | 80.5 | 101.1 | 97.6 | <<1 |

The melting point of the methyl p-aminobenzenesulphonylcarbamate in all the experiments was 140° C. (with decomposition).

No sulphanilamide was recovered in the first two experiments but, when the reaction period was 20 hours at 25° C., and 90 hours at 25° C., 0.28 moles and 0.04 moles of sulphanilamide were recovered, respectively.

EXAMPLE 17

The procedure of example 1 was followed using 0.5 mole sulphanilamide, 0.6 mole dimethyl carbonate, and various molecular proportions of sodium methoxide as indicated in the following table with methanol as solvent medium. The reaction period was 16 to 20 hours.

TABLE

| Sodium methoxide (moles) | Yield in grams of methyl p-aminobenzene sulphonyl-carbamate | Yield (percent on sulpha-nilamide) | M.P. of product (° C. dec.) | Percentage assay by nitrite titration | Percentage assay by non-aqueous titration with lithium methoxide | Percentage sulphanil-amide content by T.L.C. | Percentage by-product content by T.L.C. |
|---|---|---|---|---|---|---|---|
| 0.500 | 81.5 | 70.8 | 139 | 100.1 | 96.2 | 3 | <1 |
| 0.525 | 94.0 | 81.7 | 139 | 99.2 | 95.7 | 3 | 1 |
| 0.550 | 102.7 | 89.3 | 139 | 96.9 | 97.7 | 2 | 1 |
| 0.575 | 108.5 | 94.3 | 140.5 | 97.5 | 96.6 | 1 | 1 |
| 0.600 | 108.4 | 94.3 | 138 | 91.8 | 98.4 | <1 | 6 |
| 0.750 | 111.8 | 97.2 | 137 | 82.3 | 92.9 | 1 | 15 |
| 1.0 | 88.0 | 76.5 | 123 | 80.8 | 83.2 | 5 | 10 |

The byproduct was methyl p-methoxycarbonylaminobenzenesulphonylcarbamate.

The amounts of sulphanilamide recovered were 0.07 mole, 0.024 mole and 0.073 mole when the quantities of sodium methoxide used were 0.500 mole, 0.525 mole and 1.0 mole, respectively; in the other experiments no sulphanilamide was recovered.

EXAMPLE 18

Sulphanilamide (172 g.; 1.0 mole) was added to a solution of sodium methoxide (1.150 moles) in methanol prepared by dissolving sodium (26.5 g.) in dry methanol (300 ml.). The mixture was heated under reflux, with stirring, for one hour. Dimethyl carbonate (108 g.; 1.2 moles) was then added and heating under reflux was continued for 17 hours. The reaction mixture was then distilled. When 180 ml. of distillate (containing methanol and unreacted dimethyl carbonate, which may be reused) had been collected, water (400 ml.) was added to the residue and distillation was continued, under reduced pressure, keeping the internal temperature of the mixture below 95° C., until only water was collected (428 ml. of distillate). During the distillation, water (80 ml.) was added to maintain the volume of the mixture. The final volume of the mixture was 350 ml. One-half of this mixture (175 ml.) was stirred with ground calcium chloride (6 g.) for 30 minutes at 50° C. The insoluble material, consisting of calcium carbonate, was removed by filtration of the warm mixture. The residue was washed with water (5 ml.) and the filtrate and washings were combined. The aqueous solution of the sodium salt of methyl p-aminobenzenesulphonylcarbamate thus obtained (169 ml.; 217.2 g.) was suitable for use as a herbicidal spray concentrate and assayed by nitrite titration at 60.6 percent w/v as methyl p-aminobenzenesulphonylcarbamate, equivalent to 89.2 percent of the theoretical yield on sulphanilamide. The solution had a residual carbonate content equivalent to 0.1 percent w/v calculated as sodium carbonate and the calcium content was 23 parts per million. Methyl p-aminobenzenesulphonylcarbamate liberated from a sample of the solution by acidification had a melting point of 139.2° C. (with decomposition) and an assay by nonaqueous titration with lithium methoxide of 98.8 percent w/w.

In the above preparation, calcium chloride may be replaced by an equivalent amount of calcium hydroxide, e.g., 3.5 g. of calcium hydroxide per 0.5 mole of sulphanilamide used.

EXAMPLE 19

Sulphanilamide (86 g.; 0.5 mole) was added to a solution of potassium methoxide (0.575 mole) in methanol, prepared by dissolving potassium (22.45 g.) in methanol (200 ml.), and the mixture was heated under reflux, with stirring, for 1 hour. Dimethyl carbonate (54 g.; 0.6 mole) was then added and heating under reflux was continued for 40 hours. The reaction mixture was then distilled. When 140 ml. of distillate (containing methanol and unreacted dimethyl carbonate, which may be reused) had been collected, water (57 ml.) was added to the residue and distillation was continued until the temperature of the mixture reached 95° C. (66 ml. distillate), the volume of the mixture being maintained constant during the distillation by addition of water (66 ml.). The mixture was cooled to ambient temperature. The pH of the mixture was adjusted to 6 by the addition of concentrated hydrochloric acid (14.7 ml.). The mixture was seeded with a small quantity of sulphanilamide and then stirred for one hour. Precipitated sulphanilamide was filtered off and washed with water (20 ml.). The filtrate and washings were combined and made alkaline to thymolphthalein with 40 percent w/v potassium hydroxide solution and the mixture was then distilled under reduced pressure. When 86 ml. of distillate had been collected, the residue was cooled to 40° C. and the pH of the mixture adjusted to 8.4 by the addition of concentrated hydrochloric acid (4.3 ml.). To the mixture at 40° C. potassium chloride (32 g.) was added to salt out the potassium salt of methyl p-aminobenzenesulphonylcarbamate. The mixture was cooled to 5° C., stirred at 5° C. for 1 hour and the precipitate filtered off and sucked dry on the filter. The precipitate was then dried at 60° C. to give the potassium salt of methyl p-aminobenzenesulphonylcarbamate mixed with potassium chloride (105.2 g.; corresponding to 49.8 percent of the theoretical yield on sulphanilamide allowing for potassium chloride content). [Assay by nitrite titration = 63.4 percent as potassium salt of methyl p-aminobenzenesulphonylcarbamate. Chloride content = 36.1 percent as potassium chloride].

Methyl p-aminobenzenesulphonylcarbamate liberated from the potassium salt obtained above had a melting point of 144.5° C. (with decomposition). [Assay by nitrite titration = 99.5 percent Assay by nonaqueous titration with lithium methoxide = 97.4 percent].

From the filtrate a second crop of material separated and was isolated as before to give the potassium salt of methyl p-aminobenzenesulphonylcarbamate mixed with potassium chloride (19.2 g.; corresponding to 13.2 percent of the theoretical yield on sulphanilamide allowing for potassium chloride content). [Assay by nitrite titration = 91.8 percent as potassium salt of methyl p-aminobenzenesulphonylcarbamate. Chloride content = 6.7 percent as potassium chloride].

Methyl p-aminobenzenesulphonylcarbamate liberated from this second crop of the potassium salt had a melting point of 141.3° C. (with decomposition). [Assay by nitrite titration = 98.2 percent Assay by nonaqueous titration with lithium methoxide = 97.3 percent]. 0.066 mole dimethyl carbonate and 7.9 g. (0.046 mole) sulphanilamide were recovered.

It will be appreciated that the reaction between the sulphanilamide salt of formula VI with dimethyl carbonate in methanol, in accordance with the process of the invention, can be carried out under a pressure greater than atmospheric, in which case the boiling point of the reaction mixture will be raised accordingly.

We claim:

1. Process for the preparation of alkali metal and alkaline earth metal salts of methyl p-aminobenzenesulphonylcarbamate which comprises reacting a salt of sulphanilamide of the formula:

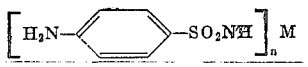

wherein M represents an alkali metal or alkaline earth metal atom and $n$ represents 1 when M represents an alkali metal atom and $n$ represents 2 when M represents an alkaline earth metal atom with dimethyl carbonate in methanol at a temperature up to the boiling point of the reaction mixture.

2. Process according to claim 1 in which the reaction is effected at a temperature of from 25° C. to 65° C.

3. Process according to claim 1 in which the reaction is effected at or near 65° C.

4. Process according to claim 1 in which 1 to 1.2 molar proportions of dimethyl carbonate are employed for each molar proportion of the sulphanilamide salt.

5. Process according to claim 1 in which M represents an alkali metal atom.

6. Process according to claim 5 in which M represents a sodium atom.

7. Process according to claim 1 in which the reaction is carried out in the presence of 0.05 to 0.15 moles of an alkali metal or alkaline earth metal hydride, alkoxide or amide, per mole of sulphanilamide salt.

8. Process according to claim 7 in which the reaction is carried out in the presence of 0.05 to 0.15 moles of an alkali metal or alkaline earth metal alkoxide per mole of sulphanilamide salt.

9. Process according to claim 7 in which the reaction is carried out in the presence of an alkali metal hydride, alkoxide or amide.

10. Process according to claim 9 in which the reaction is carried out in the presence of sodium hydride, a sodium alkoxide or sodamide.

11. Process according to claim 7 in which the reaction is carried out in the presence of sodium methoxide.

12. Process according to claim 1 for the preparation of methyl p-aminobenzenesulphonylcarbamate which comprises reacting a salt of sulphanilamide of the formula:

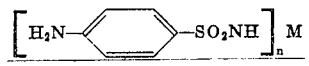

wherein M represents an alkali metal or alkaline earth metal atom and $n$ represents 1 when M represents an alkali metal atom and $n$ represents 2 when M represents an alkaline earth metal atom with dimethyl carbonate in methanol at a temperature up to the boiling point of the reaction mixture, and treating the resulting alkali metal or alkaline earth metal salt of methyl p-aminobenzenesulphonylcarbamate with an acid to convert the salt into the free methyl p-aminobenzenesulphonylcarbamate.

* * * * *